US010299093B2

(12) United States Patent
Chen et al.

(10) Patent No.: US 10,299,093 B2
(45) Date of Patent: May 21, 2019

(54) METHODS AND APPARATUS FOR ENHANCED CONTENTION BASED ACCESS RESPONSE MESSAGE

(71) Applicant: MEDIATEK Singapore Pte. Ltd., Singapore (SG)

(72) Inventors: Hua-Min Chen, Beijing (CN); Feifei Sun, Beijing (CN)

(73) Assignee: HFI Innovation INC., HsinChu (TW)

( * ) Notice: Subject to any disclaimer, the term of this patent is extended or adjusted under 35 U.S.C. 154(b) by 196 days.

(21) Appl. No.: 15/358,034

(22) Filed: Nov. 21, 2016

(65) Prior Publication Data

US 2017/0078831 A1 Mar. 16, 2017

Related U.S. Application Data

(63) Continuation of application No. PCT/CN2015/093982, filed on Nov. 6, 2015.

(30) Foreign Application Priority Data

Nov. 7, 2014 (WO) ................ PCT/CN2014/090596

(51) Int. Cl.
*H04W 74/00* (2009.01)
*H04W 4/70* (2018.01)
(Continued)

(52) U.S. Cl.
CPC ................ *H04W 4/70* (2018.02); *H04L 1/00* (2013.01); *H04L 1/0046* (2013.01); *H04L 1/08* (2013.01);
(Continued)

(58) Field of Classification Search
CPC ... H04W 4/70; H04W 74/0866; H04W 56/00; H04W 72/0453; H04W 72/0406;
(Continued)

(56) References Cited

U.S. PATENT DOCUMENTS 8,964,658 B2 2/2015 Chen et al. .............. 370/329
2009/0046637 A1* 2/2009 Kim ................... H04W 72/005
370/329

(Continued)

FOREIGN PATENT DOCUMENTS

CN 101715237 A 5/2010
CN 102612852 A 7/2012
(Continued)

OTHER PUBLICATIONS

International Search Report and Written Opinion of International Search Authority for PCT/CN2015/093982 dated Feb. 14, 2015 (11 pages).

(Continued)

*Primary Examiner* — Lan-Huong Truong
(74) *Attorney, Agent, or Firm* — Imperium Patent Works; Helen Mao

(57) ABSTRACT

Methods and apparatus for obtaining a response message for CB access uplink transmission are disclosed. In one novel aspect, UE performs a CB access uplink transmission, selects a first group of radio resources for one or more candidate control-less response message blocks with corresponding transmission repetition number, retrieves and decodes one candidate response message block corresponds to one sub-group of resources in the first group of radio resources and determines if the candidate response message is intended for the UE. In one embodiment, the UE obtains the candidate response message by determining one or more repetition number and obtaining corresponding sub-group of resources from the starting point(s). In another embodiment, the UE determines one or more frequency locations to obtain the candidate response message. In yet another embodiment, the UE selects a second group of radio resources if no
(Continued)

response message is detected within the first group of radio resources.

21 Claims, 10 Drawing Sheets

(51) Int. Cl.
  *H04L 1/00*    (2006.01)
  *H04L 5/00*    (2006.01)
  *H04W 72/04*   (2009.01)
  *H04W 56/00*   (2009.01)
  *H04W 74/08*   (2009.01)
  *H04L 1/08*    (2006.01)

(52) U.S. Cl.
  CPC .............. *H04L 5/00* (2013.01); *H04W 56/00* (2013.01); *H04W 72/0453* (2013.01); *H04W 74/0866* (2013.01); *H04W 72/0406* (2013.01)

(58) Field of Classification Search
  CPC . H04L 1/08; H04L 1/0046; H04L 5/00; H04L 1/00
  See application file for complete search history.

(56) References Cited

U.S. PATENT DOCUMENTS

| | | | | |
|---|---|---|---|---|
| 2013/0107838 A1* | 5/2013 | Li | .................... | H04W 74/0866 370/329 |
| 2014/0126520 A1 | 5/2014 | Quan et al. | ................... | 370/329 |
| 2015/0109998 A1 | 4/2015 | Yang | .............................. | 370/328 |
| 2015/0326995 A1 | 11/2015 | Li et al. | ......................... | 370/329 |
| 2015/0359007 A1 | 12/2015 | Liu et al. | ....................... | 370/329 |

FOREIGN PATENT DOCUMENTS

| | | |
|---|---|---|
| CN | 102883459 A | 1/2013 |
| CN | 103220811 A | 7/2013 |
| CN | 103297207 A | 9/2013 |
| CN | 103826318 A | 5/2014 |
| CN | 103945557 A | 7/2014 |
| WO | WO2014177092 A1 | 11/2014 |

OTHER PUBLICATIONS

EPO, Search Report for the EP patent application 15856890.7 dated Nov. 29, 2017 (17 pages).

3GPP TSG RAN WG1 Meeting #78bis R1-144077, Alcatel-Lucent et al., "Coverage enhancement for common control messages", Ljubljana, Slovenia, Oct. 6-10, 2014 (4 pages).

3GPP TSG RAN Wg1 Meeting #78bis R1-143772, Intel Corp., "Discussion on common control message enhancement for eMTC", Ljubljana, Slovenia, Oct. 6-10, 2014 (6 pages).

3GPP TSG-RAN WG1 Meeting #75 R1-135155, Alcatel-Lucent et al., "PRACH Coverage Enhancement for MTC UE", San Francisco, USA, Nov. 11-15, 2013 (8 pages).

3GPP TSG-RAN WG1 Meeting #78bis R1-143789, Ericsson, "Common control messages for MTC", Ljubljana, Slovenia, Oct. 6-10, 2014 (6 pages).

* cited by examiner

METHODS AND APPARATUS FOR ENHANCED CONTENTION BASED ACCESS RESPONSE MESSAGE

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2015/093982, with an international filing date of Nov. 6, 2015, which in turn claims priority from PCT Application No. PCT/CN2014090596, entitled, "METHODS FOR ENHANCED CONTENTION BASED ACCESS RESPONSE MESSAGE" filed on Nov. 7, 2014. This application is a continuation of International Application PCT/CN2015/093982, which claims priority from PCT Application No. PCT/CN2014090596. International Application PCT/CN2015/093982 is pending as of the filing date of this application, and the United States is a designated state in International Application PCT/CN2015/093982. This application claims the benefit under 35 U.S.C. § 119 from PCT Application No. PCT/CN2014090596. The disclosure of each of the forgoing documents is incorporated herein by reference.

TECHNICAL FIELD

The disclosed embodiments relate generally to wireless communication, and, more particularly, to methods and apparatus for resource allocation used in enhanced contention based access response message.

BACKGROUND

Machine type communication (MTC) applications required low-cost devices and improved coverage other than the current cellular communication system. Other narrow band (NB) devices also require coverage enhancement in a wireless network. The rapid growth in the latest development of the internet of things (IoT) also has requirements enhanced coverage mode. Repetition is one common solution to achieve coverage enhancement for most physical channels/signals. These machine-to-Machine (M2M) applications required low-cost devices and improved coverage other than the current cellular communication system. For example, some smart metering deceives are often installed in the basements of residential buildings or locations shielded by foil-backed insulation, metalized windows, or traditional thick-walled building construction. These smart devices suffer a significantly larger path-loss, such as 20 dB path loss, than that in the typical operation condition of normal devices.

More resources/power is needed to support these UEs in the extreme coverage scenario. How to obtain a response message after a contention based access transmission under a coverage gap is still an open issue. Following the current design, the resource overhead is quite large if a response message is transmitted with the corresponding control information under repeated transmission since repetition has been identified as a common technique to bridge the additional penetration losses than normal LTE devices. Further, serious resource waste can be expected because response messages as a common message are targeted for different type of UEs within a cell. It requires transmitting repeatedly to bridge a largest coverage gap.

Improvement and enhancement are required to efficiently sending and receiving contentions based response messages.

SUMMARY

Methods and apparatus are provided for enhanced contention based access response messages. In one novel aspect, upon performing a CB access uplink transmission, the UE selects a first group of radio resources for one or more candidate control-less response message blocks transmitted repeatedly with one or more repetition numbers. The first group of radio resource blocks, with a first starting point, includes one or more sub-group of radio resources. The UE retrieves and decodes each sub-group of radio resources, which corresponds to one candidate response-message block. The UE subsequently determines if there a candidate response message intended for the UE. In one embodiment, the UE determines a starting point to retrieve the control-less response message block. The starting point is determined based on at least one of parameters including radio resources of the recent CB access uplink transmission, a repetition number of the recent CB uplink transmission, a starting point for the CB access uplink transmission, and an ending point for the CB access uplink transmission. In another embodiment, the starting point is predefined.

In one embodiment, the retrieving of one sub-group radio resources includes steps of determining one or more repetition numbers for the one or more candidate control-less response message blocks and obtaining one or more sub-groups of radio resources corresponding to the one or more repetition numbers from the one starting point. In another embodiment, the retrieving of one sub-group radio resources includes steps of determining one or more frequency locations for the one or more candidate control-less response message blocks, and obtaining one or more sub-groups of radio resources corresponding to the one or more frequency locations from the one starting point. In yet another embodiment, the UE selects a second group of radio resources by determining a second starting point if no response message intended for the UE was found.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
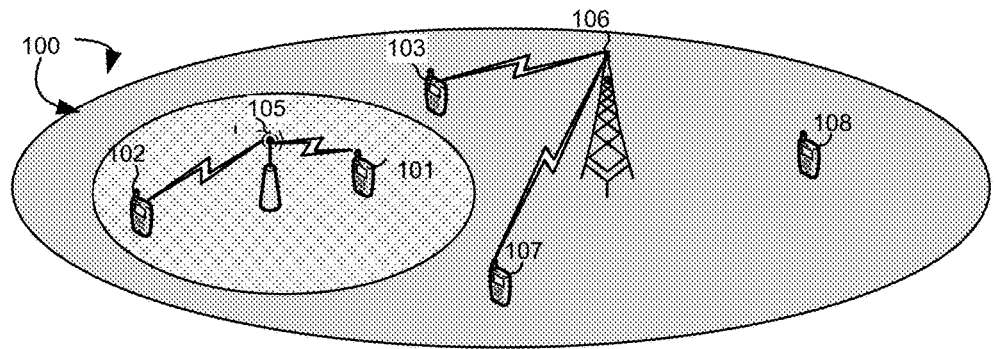
FIG. 1 illustrates an exemplary wireless communication network with control-less response messages in response to the contention based resource request in accordance with embodiments of the current invention.
Figure 1:
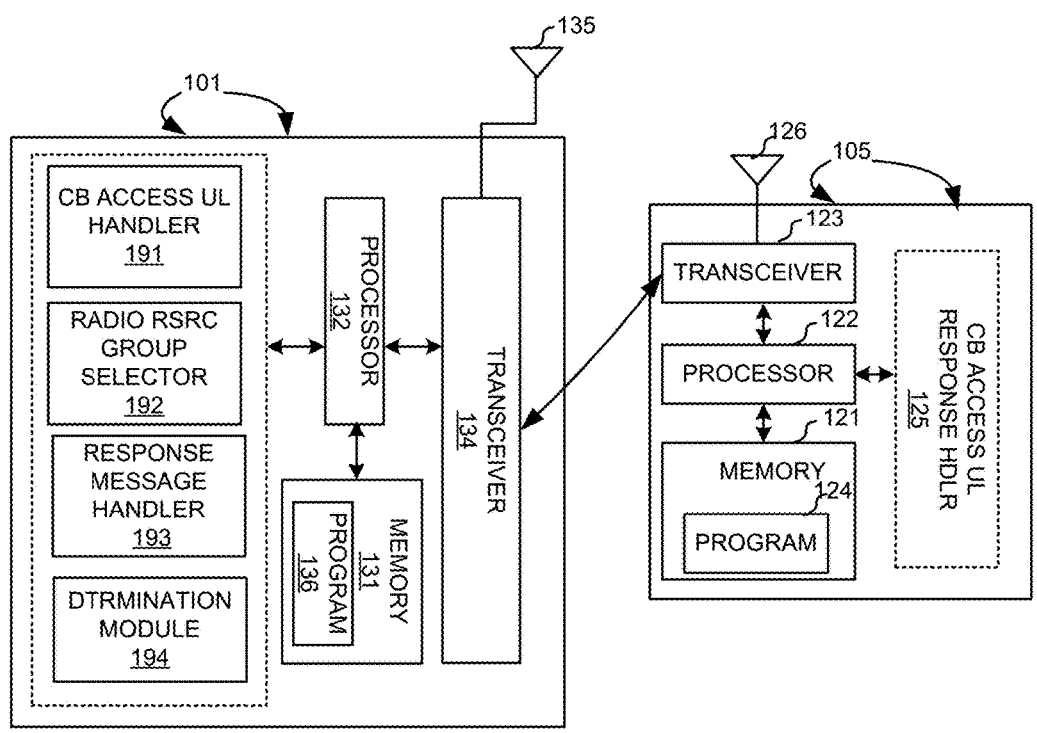

FIG. 1 illustrates an exemplary wireless communication network 100 with control-less response messages in response to the contention based resource request in accordance with embodiments of the current invention. Wireless communications system 100 includes one or more wireless networks, and each of the wireless communication network has fixed base infrastructure units, such as wireless communications devices 105 and 106. The base unit may also be referred to as an access point, an access terminal, a base station, or by other terminology used in the art. Each of the wireless communications stations 105 and 106 serves a geographic area. The geographic area served by wireless communications stations 105 and 106 overlaps.

Wireless mobile station or user equipment (UE) 101 and 102 in the wireless network 100 are served by base station 105. Other wireless communications device, such as wireless communication device 103, 107 and 108, are served by a different base station 106. Mobile station 101 is a real LC MTC UE actually in one embodiment. In another mobile station 101 is a normal or regular UE which is served/regarded as LC MTC UEs, i.e, a normal UE operating in LC-MTC mode. Then, an LC-MTC UE or UE in LC-MTC mode can be configured from a regular UE, an MTC UE or any other type of UE. The LC-MTC UE can be configured locally on the UE or dynamically configured through network signaling. Mobile station 101 and 102 send uplink data to base stations 105 and 106 via uplink channels in the time and/or frequency domain. Mobile station 101 and 102 receives downlink data from base stations 105 and 106 via downlink channels. When there is a downlink packet to be sent from the eNB to the mobile station, each mobile station gets a downlink assignment, e.g., a set of radio resources in a physical downlink shared channel (PDSCH). When a UE needs to send a packet to eNodeB in the uplink, the mobile station gets a grant from the eNodeB that assigns a physical downlink uplink shared channel (PUSCH) consisting of a set of uplink radio resources. The mobile station gets the downlink or uplink scheduling information from a physical downlink control channel (PDCCH) or an enhanced physical downlink control channel (EPDCCH) that is targeted specifically to that mobile station. The downlink or uplink scheduling information and the other control information, carried by PDCCH, is referred to as downlink control information (DCI).

In one embodiment, the communication system utilizes Orthogonal Frequency Division Multiplexing Access (OFDMA) or a multi-carrier based architecture including Adaptive Modulation and Coding (AMC) on the downlink and next generation single-carrier (SC) based FDMA architecture for uplink transmissions. SC based FDMA architectures include Interleaved FDMA (IFDMA), Localized FDMA (LFDMA), DFT-spread OFDM (DFT-SOFDM) with IFDMA or LFDMA. In OFDMA based systems, remote units are served by assigning downlink or uplink radio resources that typically comprises a set of sub-carriers over one or more OFDM symbols. Exemplary OFDMA based protocols include the developing LTE/LTE-A of the 3GPP standard and IEEE 802.16 standard. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments, the communication system may utilize other cellular communication system protocols including, but not limited to, TDMA or direct sequence CDMA. The disclosure, however, is not intended to be limited to any particular wireless communication system.

In a 3GPP LTE system based on OFDMA downlink, the radio resource is partitioned into subframes each of which is comprised of two slots and each slot has seven OFDMA symbols in the case of normal Cyclic Prefix (CP). Each OFDMA symbol further consists of a number of OFDMA subcarriers depending on the system bandwidth. The basic unit of the radio resource grid is called Resource Element (RE), which spans an OFDMA subcarrier over one OFDMA symbol. One type of the basic block of the radio resources for scheduling in LTE is called physical resource block (PRB), each of which contains several consecutive OFDM symbols in one subframe and several consecutive subcarriers in frequency domain. Virtual resource blocks (VRB) is another type of the basic block of the radio resources definition in LTE system, which have two types: localized type and distributed type. For each type of virtual resource blocks, a pair of virtual resource blocks over two slots in a subframe is assigned together by a single virtual resource block number. One downlink assignment or an uplink grant consists of one or multiple basic blocks of the radio resources, e.g., a set of PRBs.

For any cellular system, a terminal can request a connection setup, named as random access, to require resources for data packet transmission. Taking LTE system as an example, the random access is used for initial access to perform an uplink data transmission (e.g., a physical uplink shared channel (PUSCH)), to re-establish a radio link after a radio link failure, and so on. The basis for a radon access is a contention-based (CB) procedure, including a contention based access uplink transmission from a UE and a response message from an eNB to give an uplink grant. However, there is no consensus how to transmit a contention based access uplink transmission and how to receive a response message for the contention based access uplink transmission for UEs in a coverage hole. Coverage loss is expected due to reduced bandwidth in uplink and downlink, reduced maximal transmission power and so on. The target is a 15 dB coverage improvement. In one embodiment of this invention, a new design is disclosed to get a response message for a contention based (CB) access uplink transmission without control information.

In one embodiment, multiple response messages for multiple UEs constitute a response message block transmitted within a group of resources. One example is response messages for all UEs within a cell are multiplexed within a response message block and transmitted within a cell-specific group of resources. Another example is multiple response messages for a group of UEs are multiplexed within the same group of resources, wherein the group of resources is group-specific. In another embodiment, a response message block only comprises one response message dedicated for one UE without response message multiplexing. One or more response message blocks can be transmitted within a group of resources for response message transmission.

Since there is no control information, UEs have to determine the payload of a response message. In one embodiment of this invention, the payload size of one response message can be fixed. In another embodiment, multiple response messages are transmitted in a response message block. The number of response messages multiplexed within a response message block is specified to reduce detection complexity. The UE will only try a limited number of payload size when detecting a candidate response-message block.

Considering the overhead due to repeated transmission, it is assumed that there is no signaling from the base station to inform UEs the resources for the response message transmission. Then, UE has to determine one or multiple possible groups of resources to detect candidate response-message blocks. First, the UE should determine a starting time block or a starting point to receive response message blocks. Here, the time block is a time unit in the time domain, such as a subframe (1 ms per subframe) in a LTE-based wireless communication system. In one embodiment, the starting point to detect a response message is specified. One example is a value table for the starting point is designed, and the UE performs detection at possible starting points. In another embodiment, the starting point to receive a response message block is determined according to a rule, based on parameters for CB access uplink transmission, wherein the parameters comprise at least one of radio resources for the CB access uplink transmission, a starting point, and a repetition number for CB access uplink transmission. For example, a relationship between the starting point for response message and the radio resources for CB access uplink transmission is designed. A mapping rule of the starting point to receive response message and a starting point of CB access uplink transmission is predefined.

Considering scheduling flexibility, there may be one or multiple starting points. Then, one or multiple groups of potential resources can be obtained and UEs will perform blind detection within the one or multiple groups of potential resources. One embodiment of the invention proposes that a UE attempts to receive candidate response-message blocks within one group of potential resources from one starting point. If no decoded message is determined as intended for the UE, the UE should perform detection on another group of potential resources from another starting point. Until all possible groups of potential resources are detected and no intended response message is obtained, the UE can assume that there is no response message from the base station and stop detection.

Another embodiment of this invention is to set a detection time window to reduce the detection delay. It means UE will perform response message detection at any possible starting points within the time window. Once no intended message is obtained after the time window expires, UE stops message detection.

FIG. 1 further shows simplified block diagrams of wireless stations 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as resource allocation handler 125, which carries out functional tasks for control-less CB response messages and communicates with the wireless communications device 101 for resource allocation related tasks.

Wireless communications device 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

Wireless communications device 101 also includes a set of control modules that carry out functional tasks A CB access uplink handler 191 transmits a CB access uplink message. A radio-resource-group selector 192 selects a first group of radio resources for one or more candidate control-less response message blocks, wherein the first group of radio resources, with a first starting point, includes one or more sub-groups of radio resources and wherein each candidate control-less response message block is transmitted with a corresponding repetition number. A response message handler 193 retrieves and decodes each sub-group of radio resources from the first group of radio resources, wherein each sub-group of radio resources corresponds to one candidate response-message block, in other words, one or more candidate response message blocks are transmitted in the first group of radio resources. A determination module 194 determines if there is a candidate response message intended for the UE in response to the CB access uplink transmission.

In one novel aspect, control-less response messages are used for CB uplink access. In one embodiment, only one response message block is transmitted within a group of resources and the response message block comprises only one response message.

Figure 2:
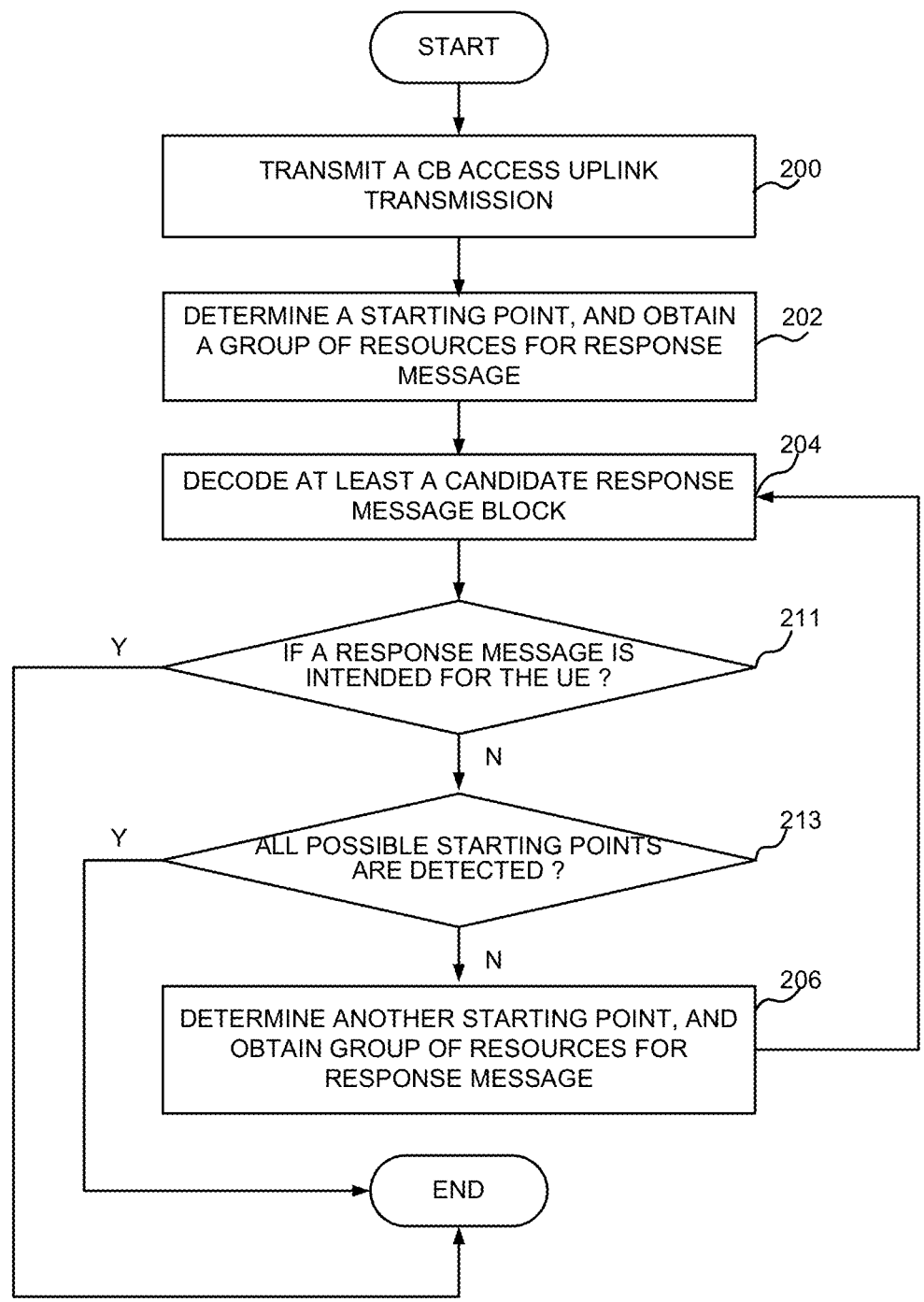
FIG. 2 shows an exemplary flow chart of detecting a control-less response message without a detection window in accordance with embodiments of the current invention.
Figure 3:
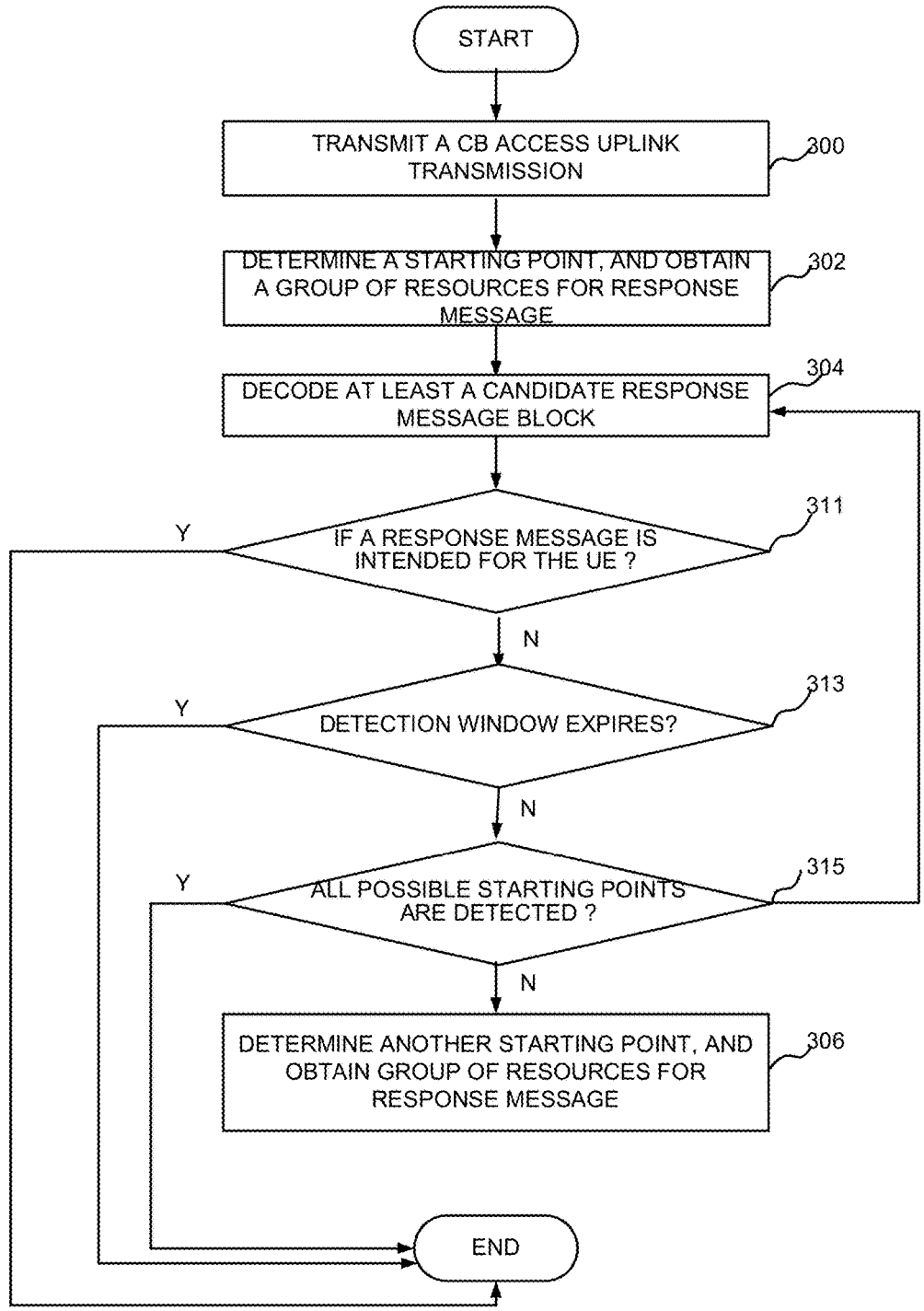
FIG. 3 shows an exemplary flow chart of detecting a control-less response message with a detection window in accordance with embodiments of the current invention.

FIG. 2 shows an exemplary flow chart of detecting a control-less response message without a detection window in accordance with embodiments of the current invention. after transmitting a CB access uplink transmission in step 200, UE will obtain a group of potential resources to receive candidate response messages in step 202 by determining a starting point and perform decoding within the group of resources, in other word, in step 202, UE will obtain a group of resources for a response message based on a starting point, and then, UE performs decoding at least one candidate response message block in step 204. If the decoded candidate response message block is determined not intended for the UE in step 211, the UE will judge whether all possible starting points of resources are detected in step 213. If there are no other possible groups of resources for detection step 213 determines yes. Subsequently, the UE ends the procedure. If there are other groups of potential resources step 203 determines no. The UE will determine another starting point and obtain another group of potential resources in step 206. In another case, UE could determine at least two starting points in step 204, so the step 206 is redefined as "obtain another group of resource for response message based on another starting point obtained in step 204", till all possible groups of resources are detected FIG. 3 shows an exemplary flow chart of detecting a control-less response message with a detection window in accordance with embodiments of the current invention. After transmitting a CB access uplink transmission in step 300, a UE will obtain a group of potential resources to receive candidate response message blocks in step 302 by determining a starting point and perform decoding a candidate response-message block within the group of resources in step 304. If the decoded candidate response messages are determined not intended for the UE in step 311, the UE will judge whether a detection time window expires in step 313. If not, the UE will judge whether all possible starting points are detected in step 315. If there are no other possible starting points, step 315 determines yes. The UE ends the procedure. If there are some other possible starting points step 315 determines no. The UE will determine another starting point, and obtain another group of potential resources in step 306. In another case, UE could determine at least two starting points in step 304. At step 306, the UE is obtains another group of resource for response message based on another starting point obtained in step 304, till all possible groups of resources are detected.

Figure 4A:
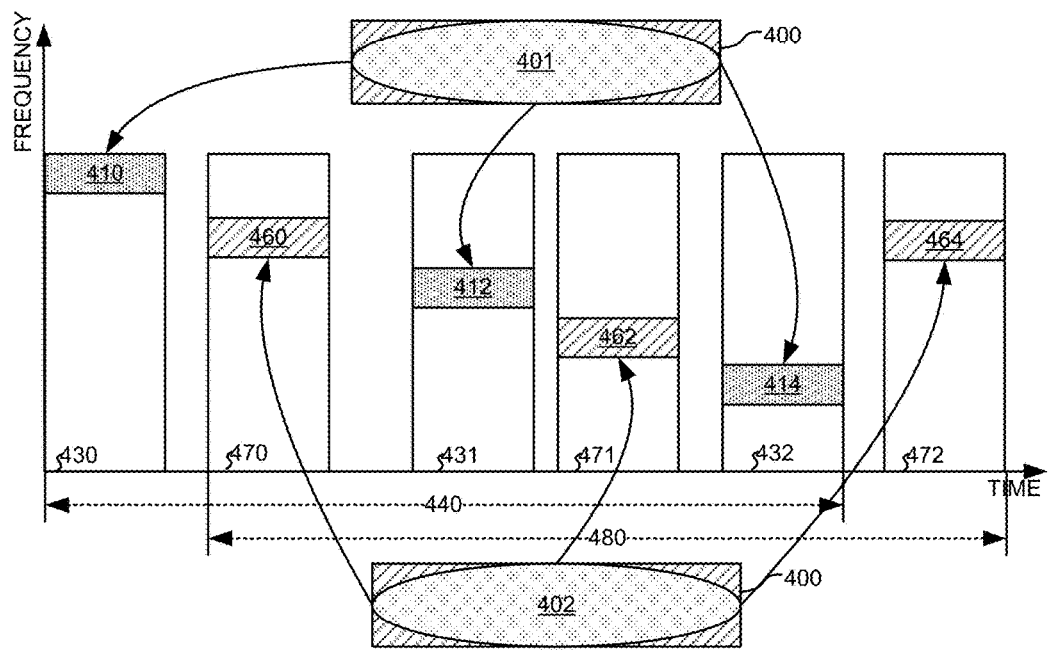
FIG. 4A shows an exemplary diagram of possible groups of orthogonal potential resources in the time domain according to embodiments of the present invention.

FIG. 4A shows an exemplary diagram of possible groups of orthogonal potential resources in the time domain according to embodiments of the present invention. Due to a coverage gap, one transmission will continue for a duration, i.e., the transmission may span over one or more time blocks in the time domain. Then, the one or multiple groups of potential resources corresponding to one or multiple starting points may overlap partially in the time domain. In another case, the one or multiple groups of potential resources are orthogonal in the time domain. As shown in FIG. 4A, for a candidate response-message block 400, there are two groups of potential resources 401 and 402, corresponding to starting point 430 and starting point 470. Resources 401 span over a multiple time blocks within a duration 440, and comprise multiple subsets of resources 410 at time block 430, 412 at time block 431 and 414 at time block 432, while resources 402 with a duration 480 comprise multiple subsets of resources 460 at time block 470, resources 462 at time block 471, and resources 464 at time block 472. In one embodiment, the potential resources 401 and 402 are orthogonal to each other in both the time domain and the frequency domain as shown in FIG. 4A.

Figure 4B:
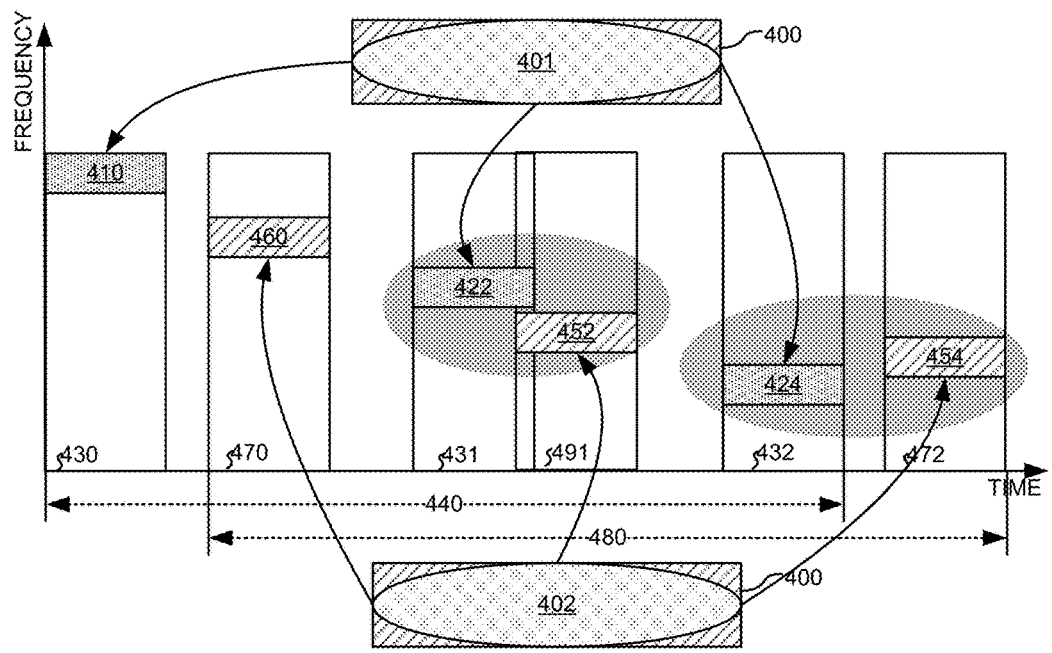
FIG. 4B shows an exemplary diagram of possible groups of partially overlapping potential resources in the time domain according to embodiments of the present invention.

FIG. 4B shows an exemplary diagram of possible groups of partially overlapping potential resources in the time domain according to embodiments of the present invention. Similar to FIG. 4A, for a candidate response-message block 400, there are two groups of potential resources 401 and 402, corresponding to starting point 430 and starting point 470. Resources 401 span over a multiple time blocks within a duration 440, and comprise multiple subsets of resources 410 at time block 430, 422 at time block 431 and 424 at time block 432, while resources 402 with a duration 480 comprise multiple subsets of resources 460 at time block 470, resources 452 at time block 471, and resources 454 at time block 472. In another embodiment, the potential resource blocks may be partially overlapping in either the time domain or the frequency domain or both. As illustrated, resource 422 of resource blocks 401 overlaps with resource 452 of resource blocks 402 in the time domain. Resource 424 of resource blocks 401 overlaps with resource 454 of resource blocks 402 in the frequency domain.

To obtain a group of resources, a repetition number of a response message should be also determined for the repeated transmission. There may be multiple repetition levels in the time domain to compensate different coverage gaps. Considering detection complexity and power consumption at the UE side, the UE detects one or more response message blocks only on one subgroup of resources within the group, by determining one repetition number, in one embodiment of this invention. That means a group of resources only comprise one subgroup of resources. To support scheduling flexibility, UE detects one or more response message blocks on several subgroups of resources, corresponding to different repetition numbers, in another embodiment. Then, the group of resources comprises several subgroups of resources from a same starting point in time domain.

Figure 5:
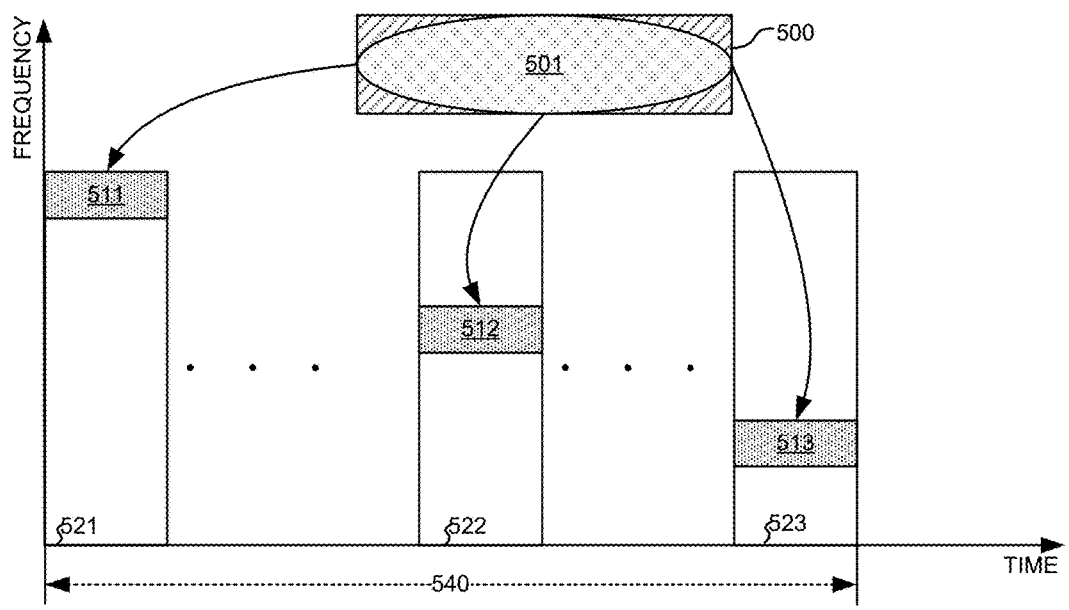
FIG. 5 shows an illustration of a group of resources comprising one subgroup of resources at one starting point according to embodiments of the present invention.

FIG. 5 shows an illustration of a group of resources comprising one subgroup of resources at one starting point according to embodiments of the present invention. At a starting point 521, a group of resources 500 only comprises one subgroup of resources 501 with a repetition number 540. Within the repetition duration, resources 501 comprise subsets of resources 511 at time block 521, 512 at time block 522 and 513 at time block 523.

Figure 6:
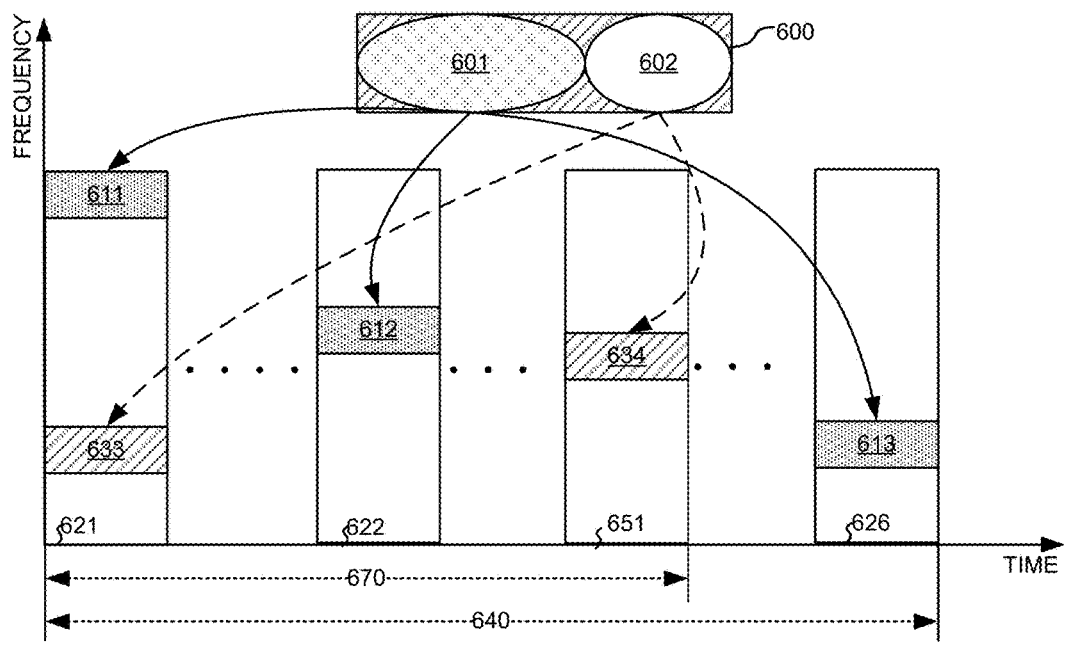
FIG. 6 shows an illustration of a group of resources comprising multiple subgroups of resources at one starting point according to embodiments of the present invention.

FIG. 6 shows an illustration of a group of resources comprising multiple subgroups of resources at one starting point according to embodiments of the present invention. At a starting point 621, a group of resources 600 comprises two subgroups of resources 601 with a repetition number 640 and 602 with a repetition number 670. A subgroup of resources 601 comprises subsets of resources 611 at time block 621, 612 at time block 622 and 613 at time block 626, while a subgroup of resources 602 comprises subsets of resources 633 at time block 621 and 634 at time block 651.

In one embodiment, since there are one or more subgroups of resources with different repetition numbers after determining a group of resources for candidate response message, UEs may perform detection within all possible subgroups of resources by determining each repetition number. That means the UE will obtain a second subgroup of resources with a second repetition number if no intended message is obtained within a first subgroup of resources corresponding to a first repetition number.

Figure 7:
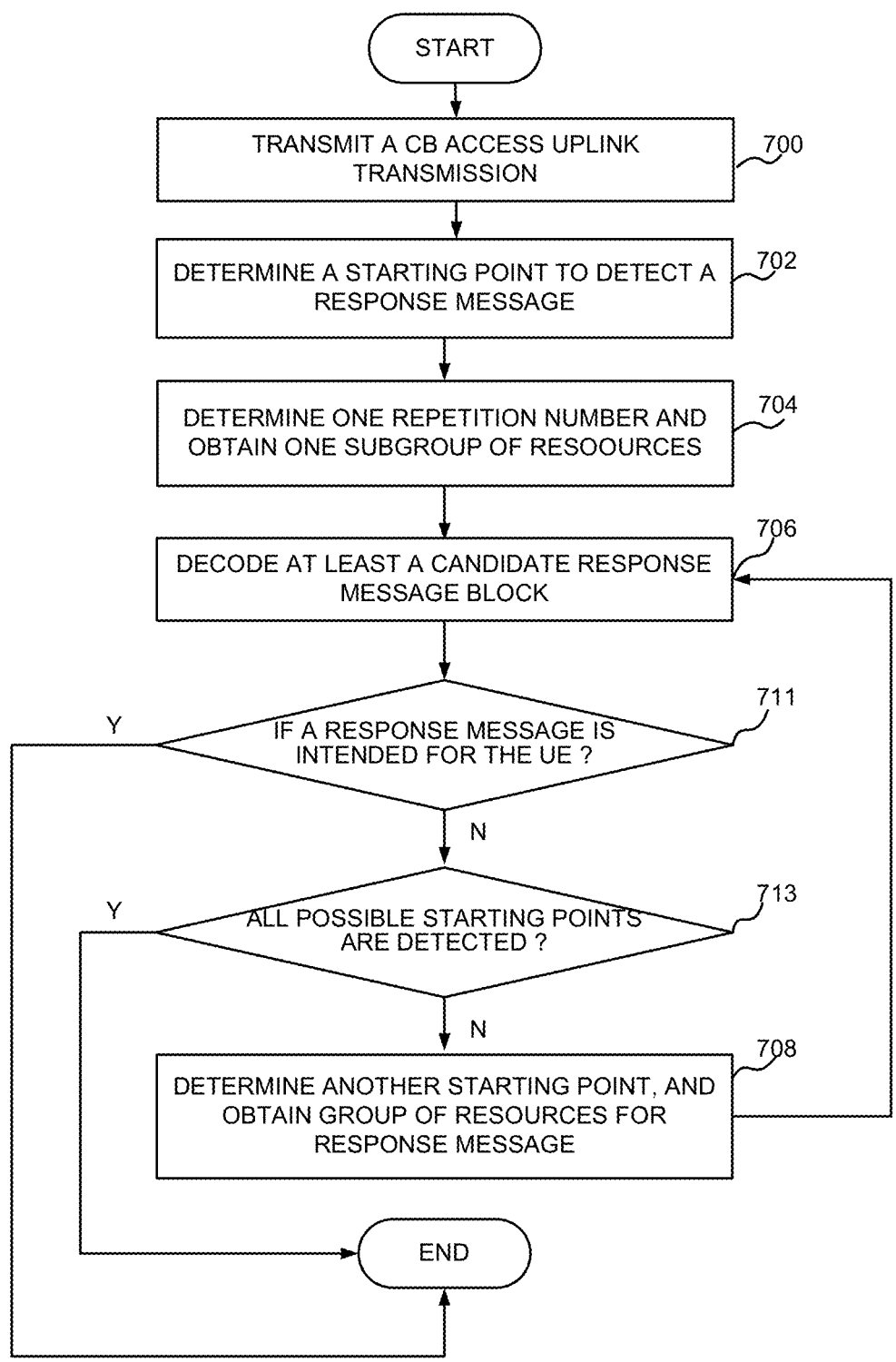
FIG. 7 shows an illustration of response-message detection procedure with one repetition number at the UE side according to embodiments of the present invention.

FIG. 7 shows an illustration of response-message detection procedure with one repetition number at the UE side according to embodiments of the present invention. After a CB access uplink transmission in step 700, the UE will first determine a starting point for response message detection in step 702. Further, a repetition number is determined to obtain a group of resources for reception in step 704. UE will judge whether the decoded candidate response message is intended for itself in step 711 after decoding at least one candidate response-message block in step 706. If the decoded information is judged as a response message intended for the UE, UE will stop further detection and end the procedure. If the decoded information is not intended for the UE, the UE will judge whether all possible starting points are detected in step 713, to obtain a response message.

If all possible starting points have been detected, UE will end the detection procedure. If there are still possible starting points for detection, UE will obtain another group of resource by determining another starting point in step 708 and perform the corresponding detection. If yes for step 711, 713, the process ends.

Figure 8:
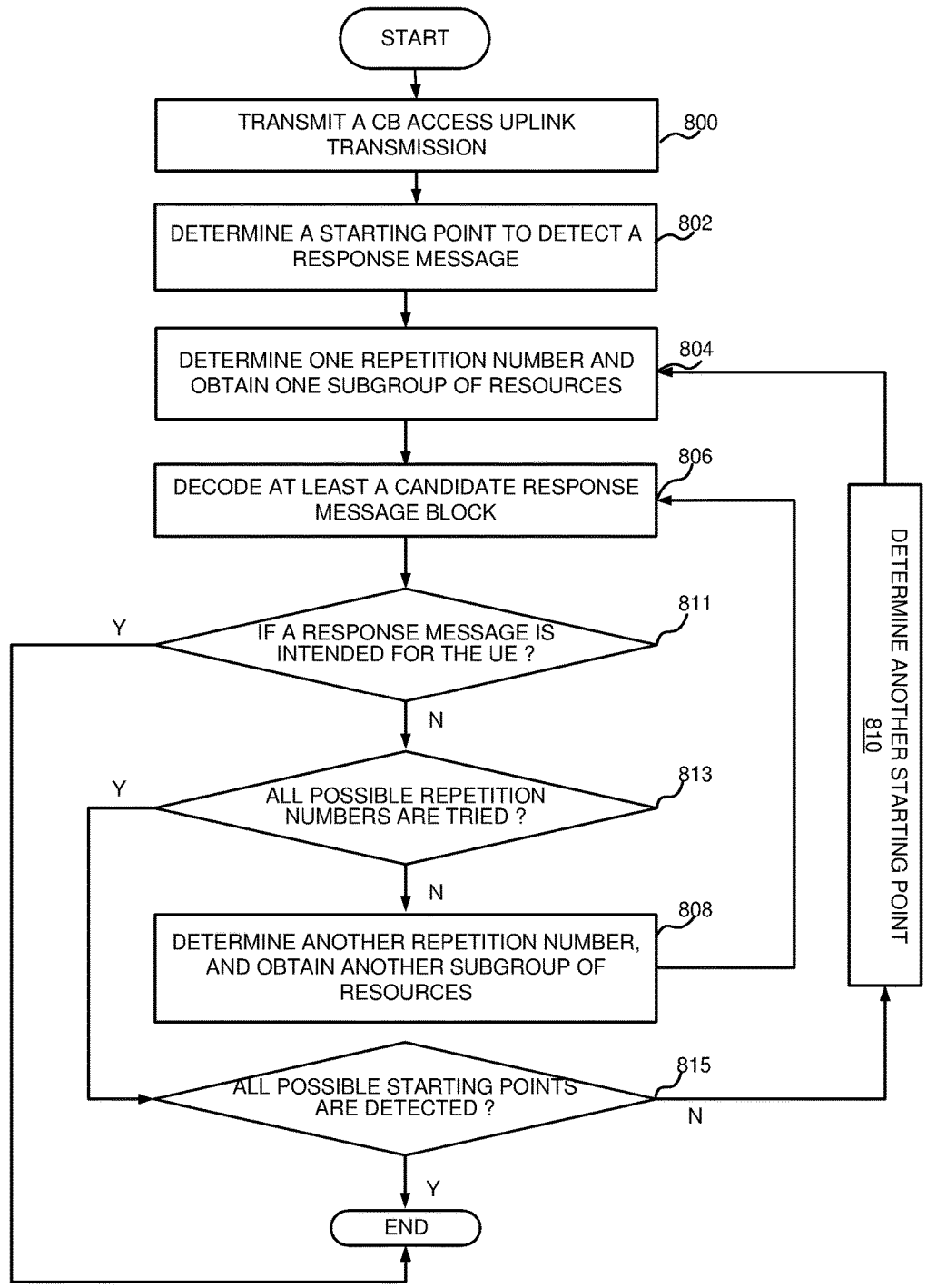
FIG. 8 shows an illustration of response-message detection procedure with different repetition number at the UE side according to embodiments of the present invention.

FIG. 8 illustrates detection procedure with multiple repetition numbers. Determining a starting point in Step 802 after transmitting a CB access uplink transmission in step 800, a UE will further determine a repetition number and obtain a subgroup of resources to receive the response message in Step 804. After the decoding within the subgroup of resources, for example, decoding at least one candidate response-message block in Step 806, UE can judge whether a decoded candidate response message is intended for the UE, in other word, UE determines if it has obtained an intended response message for itself in Step 811. If the intended response message is obtained, step 811 determines yes. The UE stops detection, and ends the procedure. If step 811 determines no, the UE will further determine whether all possible repetition numbers are tried in step 813. In case there are other possible repetition numbers not tried, step 813 determines no. The UE will determine another repetition number and obtain another subgroup of resources for response message detection in Step 808. In case all possible repetition numbers are tried, which means yes for step 813, the UE will determine whether it has tried to detect a response message at all possible starting points in step 815. If all possible starting points have been tried, UE will end the detection procedure. If there is still possible starting points for detection, which means no for step 815, UE will obtain another group of resource by determining another starting point in step 810 for a response message detection, and goes back to step 806.

In one embodiment, the repetition number for a response message block is determined by a mapping rule, which specifies a relationship between the repetition number of the response message block and a repetition number of the CB access uplink transmission. In another embodiment, the repetition number for a response message is determined by a mapping rule, which specifies a relationship between the repetition number of the response message block and the resources for the CB access uplink transmission. In a third embodiment, the repetition number for a response message block is determined by the signal format of the CB access uplink transmission.

Moreover, frequency locations should be also determined by the UE to detect a candidate response message, except for the repetition number. In one embodiment, frequency locations for resources for response messages are specified. For example, the central or edge of the system bandwidth is reserved for response message transmission. Another example is a resource table is designed, wherein frequency locations are indexed. In another embodiment, frequency locations of a group of resources are determined according to a predefined rule based on parameters to perform the CB access uplink transmission. For example, by adding an offset to the frequency locations of resources for CB access uplink transmission, the frequency locations of resources for response messages are obtained. Here, the offset is based on a resource granularity, which can be PRB pair, or a number of subcarriers, according to a LTE-based wireless communication system. The frequency location of resources for CB access uplink transmission can be lowest, or highest index of resource granularity of overall resources for CB access uplink transmission.

Figure 9:
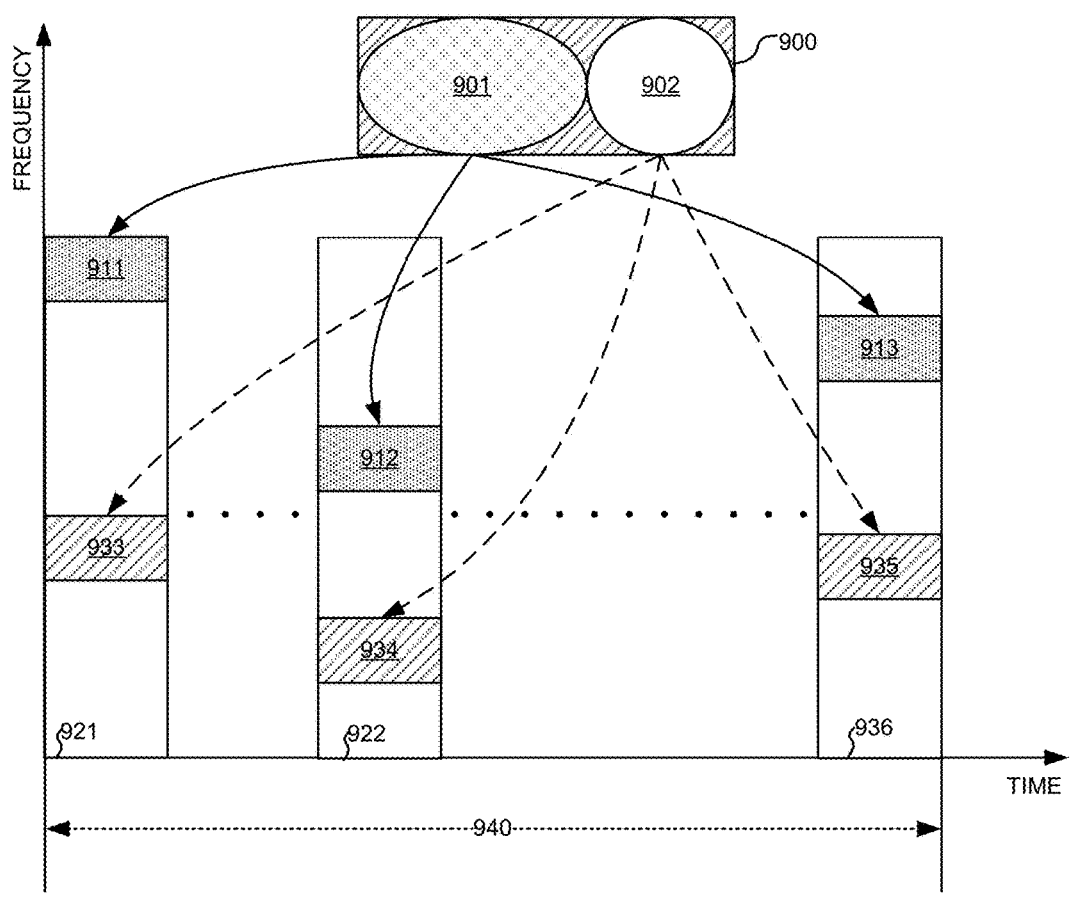
FIG. 9 shows an illustration of a group of resources comprising multiple subgroups of resources at one starting point according to embodiments of the present invention.

FIG. 9 shows an illustration of a group of resources comprising multiple subgroups of resources at one starting point according to embodiments of the present invention. Considering scheduling flexibility, multiple frequency locations can be obtained. One or multiple subgroups of resources will be obtained from the same starting point. In this figure, a candidate response-message block is transmitted in a group of resources 900 with a repetition number 940. The group of resources 900, from starting point 921 to an ending point 936, comprises subgroups of resources 901 and 902. The frequency location of subgroup of resources 901 is 911 at time block 921, 912 at time block 922 and 913 at time block 936, while the frequency location of subgroup of resources 902 is 933 at time block 921, 934 at time block 922 and 935 at time block 936.

Figure 10:
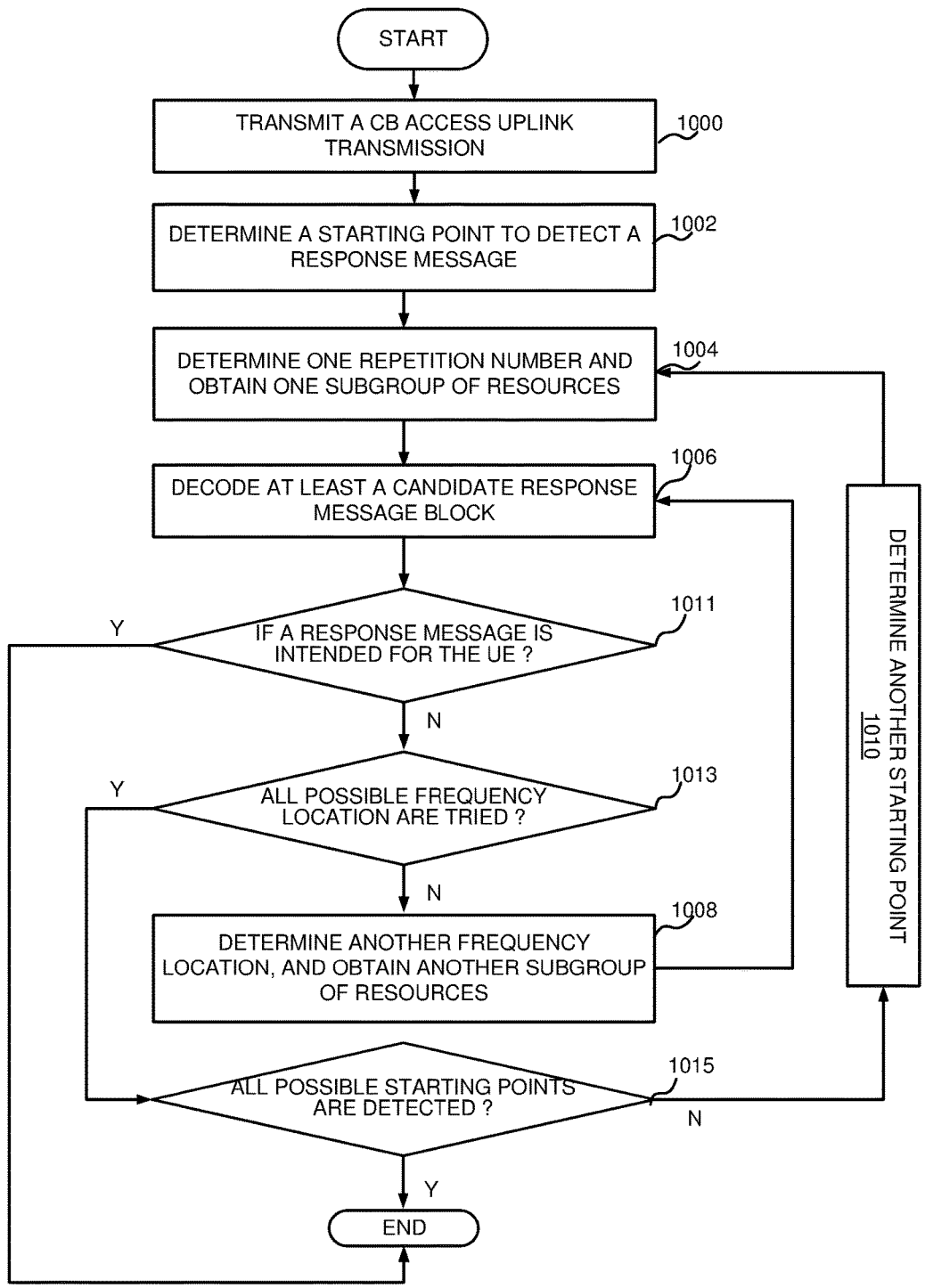
FIG. 10 shows an illustration of response-message detection procedure with multiple-try of frequency locations at UE side according to embodiments of the present invention.

FIG. 10 shows an illustration of response-message detection procedure with multiple-try of frequency locations at the UE side according to embodiments of the present invention. Since there are one or multiple subgroups of resources in frequency domain within a group of resources, UEs should perform detection in frequency domain blindly in another embodiment. That means the UE will obtain a second subgroup of resources with a second frequency location, if no intended message is obtained within a first subgroup of resources corresponding to a first frequency location. An example of response-message detection procedure with blind detection in the frequency domain is given. The UE determines a starting point in Step 1002 after transmitting a CB access uplink transmission in step 1001. The UE will further determine a frequency location and obtain a subgroup of resources for the response message in Step 1004. After the detection within the subgroup of resources and decoding at least one candidate response-message block in Step 1006, UE can determine whether the decoded candidate response message is intended for itself in Step 1011. If yes for step 1011, the UE stops detection, and ends the procedure. If no for step 1011, UE will further determine whether all possible frequency locations are tried in step 1013. In case there are still some possible frequency locations to be tried, the UE will determine another frequency location and obtain another subgroup of resources for response message detection in Step 1008. In case all possible frequency locations are tried, the UE will determine whether it has tried to detect a response message in all possible starting points in step 1015. If all possible starting points have been tried, UE will end the detection procedure. If there is still possible starting points for detection, UE will obtain another group of resources by determining another starting point in step 1010 for response message detection, and goes back to step 1006 to continue.

Figure 11:
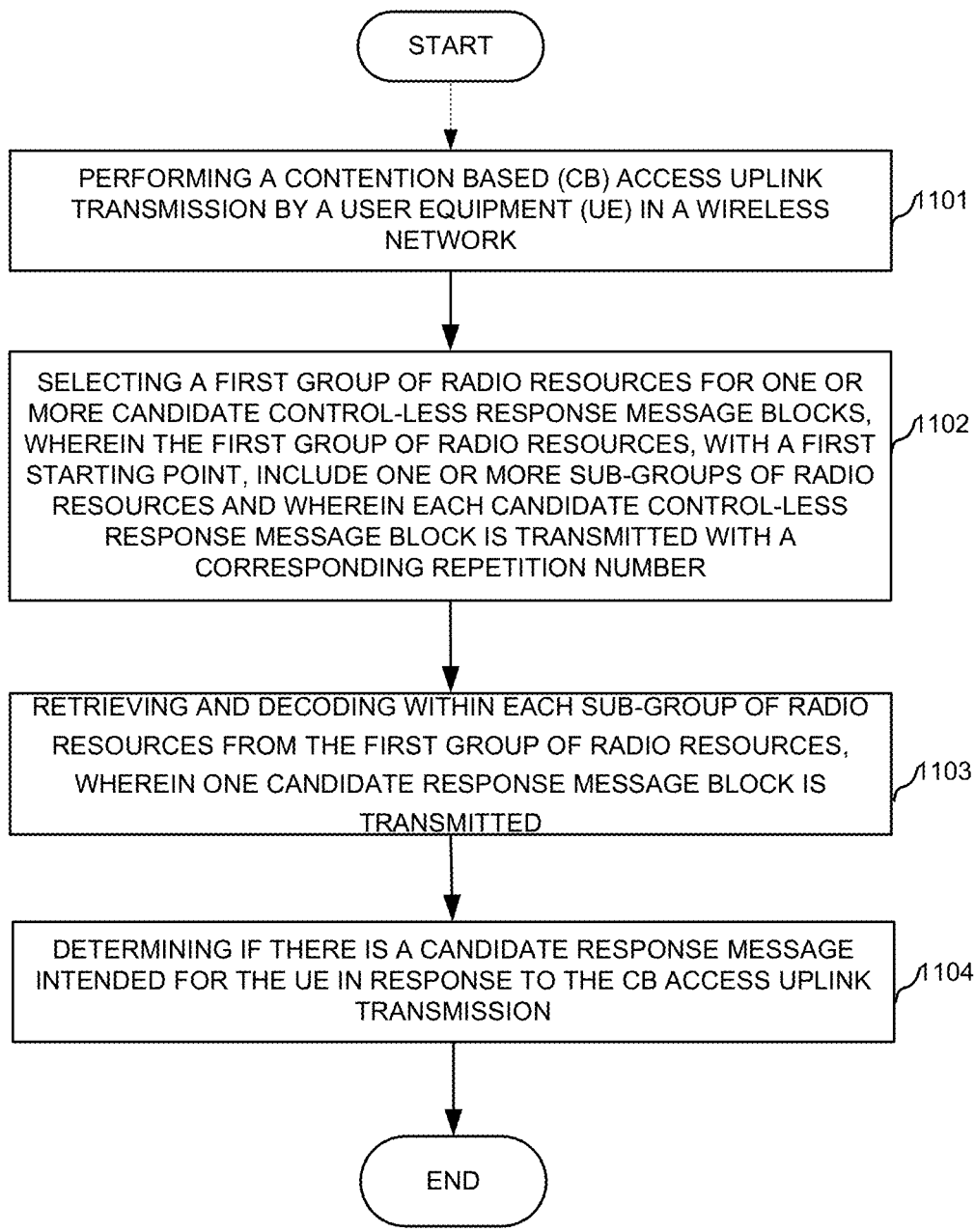
FIG. 11 shows an exemplary flow chart of detecting response-message by the UE in accordance with embodiments of the current invention.

FIG. 11 shows an exemplary flow chart of detecting response-message by the UE in accordance with embodiments of the current invention. At step 1101, the UE performs a contention based (CB) access uplink in a wireless network. At step 1102, the UE selects a first group of radio resources for one or more candidate control-less response message blocks, wherein the first group of radio resources, with a first starting point, includes one or more sub-groups of radio resources and wherein each candidate control-less response message block is transmitted with a corresponding repetition number. At step 1103, the UE retrieves and decodes each sub-group of radio resources from the first group of radio resources, wherein each sub-group of radio resources corresponds to one candidate response-message block, in other words, one or more candidate response message blocks are transmitted in the first group of radio resources. At step 1104, the UE determines if there is a candidate response message intended for the UE in response to the CB access uplink transmission.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    transmitting a contention based (CB) access uplink by a user equipment (UE) in a wireless network;
    selecting a first group of radio resources for one or more candidate control-less response message blocks, wherein the first group of radio resources, with a first starting point, includes one or more sub-groups of radio resources and wherein each candidate control-less response message block is transmitted with a corresponding repetition number;
    retrieving and decoding within each sub-group of radio resources from the first group of radio resources, wherein one candidate response message block is transmitted; and
    determining if there is a candidate response message intended for the UE in response to the CB access uplink transmission.

2. The method of claim 1, wherein the selecting of the first group of radio resource comprising: determining the first starting point to receive the one or more control-less response message blocks.

3. The method of claim 2, wherein the first starting point is determined based on at least one of the starting-pointing-related parameters comprising: radio resources of the recent CB access uplink transmission, a repetition number of the recent CB uplink transmission, a starting point for the CB access uplink transmission, and an ending point for the CB access uplink transmission.

4. The method of claim 2, wherein the starting point is predefined.

5. The method of claim 1, wherein the retrieving each corresponding sub-group radio resources from the first group of radio resources comprising:
    determining one or more repetition numbers for the one or more candidate control-less response message blocks;
    obtaining one or more sub-groups of radio resources corresponding to the one or more repetition numbers from the one starting point.

6. The method of claim 5 wherein each repetition number is determined based on at least one of repetition-number-related parameters comprising: a repetition number of the CB access uplink transmission, and radio resources for the CB access uplink transmission.

7. The method of claim 5, wherein a repetition-number determination rule for a response message block is based on at least one of parameters comprising: repetition number of the recent CB access uplink transmission, resources for the recent CB access uplink transmission, signal format of the recent CB access uplink transmission.

8. The method of claim 1, wherein the retrieving each corresponding sub-group radio resources from the first group of radio resources comprising:
    determining one or more frequency locations for the one or more candidate control-less response message blocks; and
    obtaining one or more sub-groups of radio resources corresponding to the one or more frequency locations from the one starting point.

9. The method of claim 8, wherein each frequency location is predefined.

10. The method of claim 8, wherein each frequency location is based on radio resources for the CB access uplink transmission and an offset.

11. The method of claim 1, wherein at least one subgroup of the first group of radio resources spans over one or more time blocks, wherein the one or more time blocks are discrete or contiguous.

12. The method of claim 1, further comprising:
    obtaining the control-less response message if the one or more decoded candidate response message blocks are determined as intended to the UE; otherwise: selecting a second group of radio resources by determining a second starting point, and obtaining another one or more candidate control-less response message blocks from the second group of radio resources.

13. The method of claim 12, wherein the second group of radio resources is orthogonal to the first group of radio resources.

14. The method of claim 12, wherein the second group of radio resources partially overlaps with the first group of radio resources.

15. The method of claim 1, further comprising: receiving another candidate control-less response message block from the one or more candidate control-less response message blocks, by determining a second sub-group of radio resources, if the decoded candidate control-less response message block within one sub-group of radio resources is not intended for the UE in response to the CB access uplink transmission.

16. The method of claim 1, wherein performing the CB access uplink transmission further comprising: determining a repetition number for the CB access uplink transmission, and transmitting the CB access uplink transmission with the determined repetition number over a number of time blocks.

17. The method of claim 16, wherein the repetition number for the CB access uplink transmission is determined by a mapping rule based on one of detection parameters comprising: a detection time for synchronization acquisition, and a detection time for system information to perform the CB access uplink transmission.

18. An apparatus, comprising:
    a radio frequency transceiver that transmits or receives the radio signals in a wireless communication system;
    a contention based (CB) access uplink handler that transmits a CB access uplink message;
    a radio resource group selector that selects a first group of radio resources for one or more candidate control-less response message blocks, wherein the first group of radio resources, with a first starting point, includes one or more sub-groups of radio resources and wherein each control-less response message is transmitted with a corresponding repetition number;
    a response message handler that retrieves and decodes each sub-group of radio resources from the first group of radio resources, wherein each sub-group of radio resources corresponds to one candidate response message block; and
    a determination module that determines if there is a candidate response message intended for the UE in response to the CB access uplink transmission.

19. The apparatus of claim 18, wherein the radio resource group selector further determines a starting point to receive the one or more control-less response message blocks.

20. The apparatus of claim 19, wherein the radio resource group selector further determines a repetition number for each corresponding control-less response message block.

21. The apparatus of claim 19, wherein the radio resource group selector further determines a frequency location for each corresponding control-less response message block, and obtains corresponding frequency location for each control-less response message block based on the starting point.

* * * * *